United States Patent [19]

Coxon et al.

[11] Patent Number: 5,099,174
[45] Date of Patent: Mar. 24, 1992

[54] ARC TUBE FOR A DISCHARGE LAMP

[75] Inventors: George E. Coxon, Ashby de la Zouch; Peter Hing, Hillingdon; Keith E. Parker, Rearsby, all of England

[73] Assignee: Thorn EMI plc, London, England

[21] Appl. No.: 378,988

[22] Filed: Jul. 12, 1989

[30] Foreign Application Priority Data

Jul. 12, 1988 [GB] United Kingdom ................ 8816510

[51] Int. Cl.$^5$ ............................ H01J 61/36; H01J 9/26
[52] U.S. Cl. ........................................ 313/623; 313/636; 501/69
[58] Field of Search ...................... 501/15, 55, 68, 69; 313/623, 636

[56] References Cited

U.S. PATENT DOCUMENTS

| 3,940,255 | 2/1976 | Harrington et al. ................. | 501/69 |
| 4,694,219 | 9/1987 | Hing ................................... | 501/69 |

FOREIGN PATENT DOCUMENTS

| 0055049 | 6/1982 | European Pat. Off. |
| 0220813 | 5/1987 | European Pat. Off. |
| 59-219850 | 12/1984 | Japan |
| 1109821 | 2/1966 | United Kingdom |
| 1544779 | 4/1979 | United Kingdom |
| 2812859 | 10/1979 | United Kingdom |

OTHER PUBLICATIONS

Navy Technical Disclosure Bulletin, vol. 5, No. 5, May 1980, pp. 33-38, Navy Case No. 64135, by Kretschmer et al.

*Primary Examiner*—Donald J. Yusko
*Assistant Examiner*—Diab Hamadi
*Attorney, Agent, or Firm*—Fleit, Jacobson, Cohn, Price, Holman & Stern

[57] ABSTRACT

A sealing composition is provided for joining crystalline ceramic or cermet parts, e.g. in an arc tube for a discharge lamp. The sealing composition comprises, as starting materials, a mixture of alumina ($Al_2O_3$), silica ($SiO_2$) and magnesia (MgO), the mixture comprising in the ranges of from 22% to 24.5% by weight of $Al_2O_3$, from 45.5% to 49.5% by weight of $SiO_2$, and from 26.0% to 32.5% by weight of MgO. The sealing composition contains less than 40% by weight, of the mixture, of the crystalline phase α-Cordierite when subjected to the following test procedure.

(i) sintering the mixture at 1200° C. for 10 hours to produce a friable lump which is crunched and heated at 1550° C. for 2 hours while the glass is in a molten condition;

(ii) pouring the resulting material into water to form a brittle frit and, after drying at 160° C., grinding the glass to a powder particle less than 180 μm;

(iii) mixing the glass with 4% by weight of a solution in toluene of methyl/butyl methacrylate, and pressing the mixture in a 16 mm diameter die at 100 MPa to produce 1 g samples;

(iv) sintering a sample continuously for 6 hours at a temperature equal to or greater than the temperature a seal made from the sealing composition is intended to withstand; and (v) evaluating the proportion by weight of the crystalline phase α-Cordierite in the samples sintered at the sintering temperature.

13 Claims, 3 Drawing Sheets

ARC TUBE FOR A DISCHARGE LAMP

The present invention relates to arc tubes for discharge lamp, and, in particular, to such arc tubes in which a sealing composition is used to seal an end closure member hermetically to an end of a crystalline ceramic tube. The present invention in particular relates to a sealing composition for use with such an arc tube.

BACKGROUND TO THE INVENTION

A problem facing the designer of a high pressure metal halide lamp intended for operation at low power (150 W and below) is that of achieving adequate partial pressure of metal halides, for example iodides, chlorides and bromides of tin, sodium indium and thallium, in the lamp fill. This generally requires the lamp to be arranged to operate at a relatively high minimum arc tube temperature. Conventionally, metal halide lamps have fused silica envelopes, but arc tubes made of a light-transmitting crystalline ceramic material, for example polycrystalline alumina, sapphire or a spinel, allow lamps to operate at cool spot temperatures above 600° C., and particularly between 700° C. and 1000° C.

EP55049 (THORN EMI) discloses a sealing composition including MgO, $Al_2O_3$ and $SiO_2$. The preferred compositions contain up to 5% by weight of nucleating agent, from 51 to 62% by weight of silica, from 13 to 21% by weight of alumina and from 25 to 28% by weight of magnesia. Glassy seals produced, according to this patent, tend to soften at about 700° C. and, in general, would be unsatisfactory for use in lamps operating with end temperatures in the range of 700° to 1000° C., for example, because the fill would be able to escape through the softened and so weakened lamp seal.

EP55049 specifically discloses a sealing composition (referred to hereinafter as Xo) consisting of 28% by weight MgO, 20% by weight $Al_2O_3$ and 52% by weight $SiO_2$, which has been widely used as a sealing material for crystalline Ceramic Metal Halide (CMH) lamps. This composition has the advantage of melting, and so being sufficiently fluid to flow and penetrate between the parts to be joined, at a temperature, typically around 1385° C. (as measured by Differential Thermal Analysis (DTA)), which is low enough to allow a preferred, so-called multihead sealing technique to be adopted. A disadvantage of this known sealing composition, however, is that it produces a glassy seal which softens and so is weakened at a temperature around 700°-800° C. which is generally lower than the end operating temperature of CMH lamps. Due to this softening at relatively low temperatures, a recrystallisation treatment in the form of a separate thermal crystallisation schedule is required on virgin lamps to deliberately develop crystalline phases such as $\mu$- and $\alpha$-Cordierite. The presence of these phases raises the softening temperature in the mixed glassy and crystalline seal. However, during lamp operation with end temperatures above 850° C. crystallisation of the seal tends to continue to completion. The major phase present ($\mu$-Cordierite) is metastable and transforms to $\alpha$-Cordierite which has a low coefficient of thermal expansion ($TE = 25 \times 10^{-7}/°C.$) as compared with that of the crystalline ceramic arc tube. At higher temperatures the $\alpha$-Cristobalite phase is formed which suffers from a phase transformation on cooling. Volume changes occur during these transformations and due to differential contractions or expansions of the phases present when cooling or heating the arc tube. The overall effect usually increases the stress in the seal area resulting in cracking of the alumina monolith and subsequent lamp failure during switching. Hitherto, this property of the sealing material has limited lamp design to operation at end temperatures below 850° C.

GB 1544779 (National Research Development Corporation) describes a glass ceramic composition comprising MgO 20-35 mol %, $Al_2O_3$ 20-35 mol %, $SiO_2$ 30-60 mol %, $TiO_2$ 7-20 mol % and ZnO 0-7 mol % but this has the major disadvantage of having a much higher melting temperature (1450° C. as measured by DTA) than that of the afore-mentioned composition Xo.

SUMMARY OF THE INVENTION

It is an object of this invention to provide an arc tube utilising a sealing composition which alleviates at least some of the afore-mentioned problems.

According to a first aspect of the invention there is provided a sealing composition for joining crystalline ceramic or cermet parts, the sealing composition comprising, as starting materials, a mixture of alumina ($Al_2O_3$) silica ($SiO_2$) and magnesia (MgO) in the range of from 22% to 24.5% by weight of $Al_2O_3$, from 45.5% to 49.5% by weight of $SiO_2$ and from 26.0% to 32.5% by weight of MgO; the sealing composition containing less than 40% by weight (expressed as the percentage of the total weight of the mixture) of the crystalline phase $\alpha$-Cordierite when subjected to a test procedure comprising the following steps:

(i) thoroughly mixing the constituents of the sealing composition and sintering the mixture at 1200° C. for 10 hours to produce a friable lump which is crushed, transferred to a platinum (10% Rhodium) crucible, and heated in a muffle furnace at 1550° C. for 2 hours while the glass is in a molten condition;

(ii) pouring the contents of the crucible into distilled water to form a brittle frit or cullet and, after drying at 160° C., grinding the glass in an Agate Cone Grinder to form a powder of particle size less than 180 $\mu$m;

(iii) mixing the powdered glass with 4% by weight of a binder comprising a solution in toluene of methyl/butyl methacrylate, and pressing the mixture in a 16 mm diameter die at 100 MPa to produce 1g samples;

(iv) sintering a sample continuously for 6 hours at a sintering temperature equal to or greater than the temperature a seal made from the sealing composition is intended to withstand; and (v) evaluating, by X-ray Diffractometry, the proportion by weight (expressed as a percentage of the total weight of the mixture of the crystalline phase $\alpha$-Cordierite in the sample sintered at the sintering temperature.

The sintering procedure defined in step (iv) of the "test procedure" is intended to simulate conditions prevailing in an actual lamp seal and, in particular, the seal of a CMH lamp. For this reason, the sintering temperature is preferably 1000° C. In fact, the sintering procedure which has been defined does not represent a complete simulation of the conditions in an actual lamp seal. In practice, the sealing material is in contact with both the alumina arc tube and the cermet end closure, and during sealing a small amount of alumina from the arc tube and/or the end closure may dissolve in the seal material tending to encourage crystallisation at the seal interface. Thus even a notionally glassy (non-crystalline) seal could contain traces of crystalline material. The sintering procedure defined in the "test procedure"

does not take this effect into account. Nevertheless, the inventors believe that the "test procedure" defined hereinbefore is adequate to identify those compositions which can, in practice, be utilised as lamp seals.

The inventors believe that the most useful compositions lie in the area enclosed by the broken line referenced as E in the ternary phase diagram of FIG. 2.

A particularly useful composition referenced as 1 in FIG. 2 consists of 22.9% by weight of $Al_2O_3$, 46.3% by weight of $SiO_2$ and 30.8% by weight of MgO.

The sealing composition may optionally include titania ($TiO_2$) as a nucleating agent, typically up to 5% by weight expressed as a percentage of the total weight of the sealing composition.

The sealing compositions according to the invention fall within the spinel field on the $Al_2O_3$, $SiO_2$, MgO ternary phase diagram.

Sealing compositions in accordance with the invention are found to have relatively high softening temperatures, typically in the range 950° C.–1000° C. (measured by a Hot Stage Microscope), as compared with the softening temperature (700°–800° C.) of the known composition (Xo) described in our European patent No. 55049 (referred to hereinbefore), and they have similar melting temperatures, typically around 1380°–1390° C. (measured by Differential Thermal Analysis). The melting temperatures are, of course, much lower than for the glasses described in GB 1544779.

According to a second aspect of the present invention, there is provided an arc tube for a discharge lamp, the arc tube comprising an envelope of crystalline ceramic material and one or more end closures hermetically sealed to the envelope by a sealing composition provided in accordance with said first aspect.

In arc tubes with seals produced according to said first aspect, the proportion of α-Cordierite in the seal, is low. α-Cordierite, has a relatively low coefficient of thermal expansion (TE=25×10$^{-7}$/°C.) and is generally undesirable. Thus, the overall coefficient of thermal expansion of the lamp seal will be reasonably close to that of the arc tube material, e.g. alumina (TE=88×10$^{-7}$/°C.). Typically, the crystalline phases which predominate include Enstatite (TE=78×10$^{-7}$/°C.), Forsterite (TE=94×10$^{-7}$/°C.) and Spinel (TE=76×10$^{-7}$/°C.).

The phases present are resistant to change at high temperatures (about 1000° C.) and stresses in the seal area are reduced compared with those when composition Xo is used, even when the lamp is operating at high temperatures. Furthermore, the relatively high softening temperature of the sealing composition ensures that the lamp seal is not weakened at the end operating temperatures required for eg CMH lamps whereas the melting temperature of the sealing composition, being similar to that of the sealing compositions of EP 55049, mean that the sealing process can take place at similar temperatures.

According to a third aspect of the present invention, there is provided an arc tube for a discharge lamp, the arc tube comprising an envelope of crystalline ceramic material and one or more end closures hermetically sealed to the envelope by a seal formed from a sealing composition comprising, as starting materials, a mixture of $Al_2O_3$, $SiO_2$ and MgO, the seal containing less than 40% by weight of the crystalline phase α-Cordierite.

BRIEF DESCRIPTION OF THE DRAWINGS

The invention will now be described by way of example only and with reference to the accompanying drawings, of which.

DESCRIPTION OF THE PREFERRED EMBODIMENTS

Figure 1:
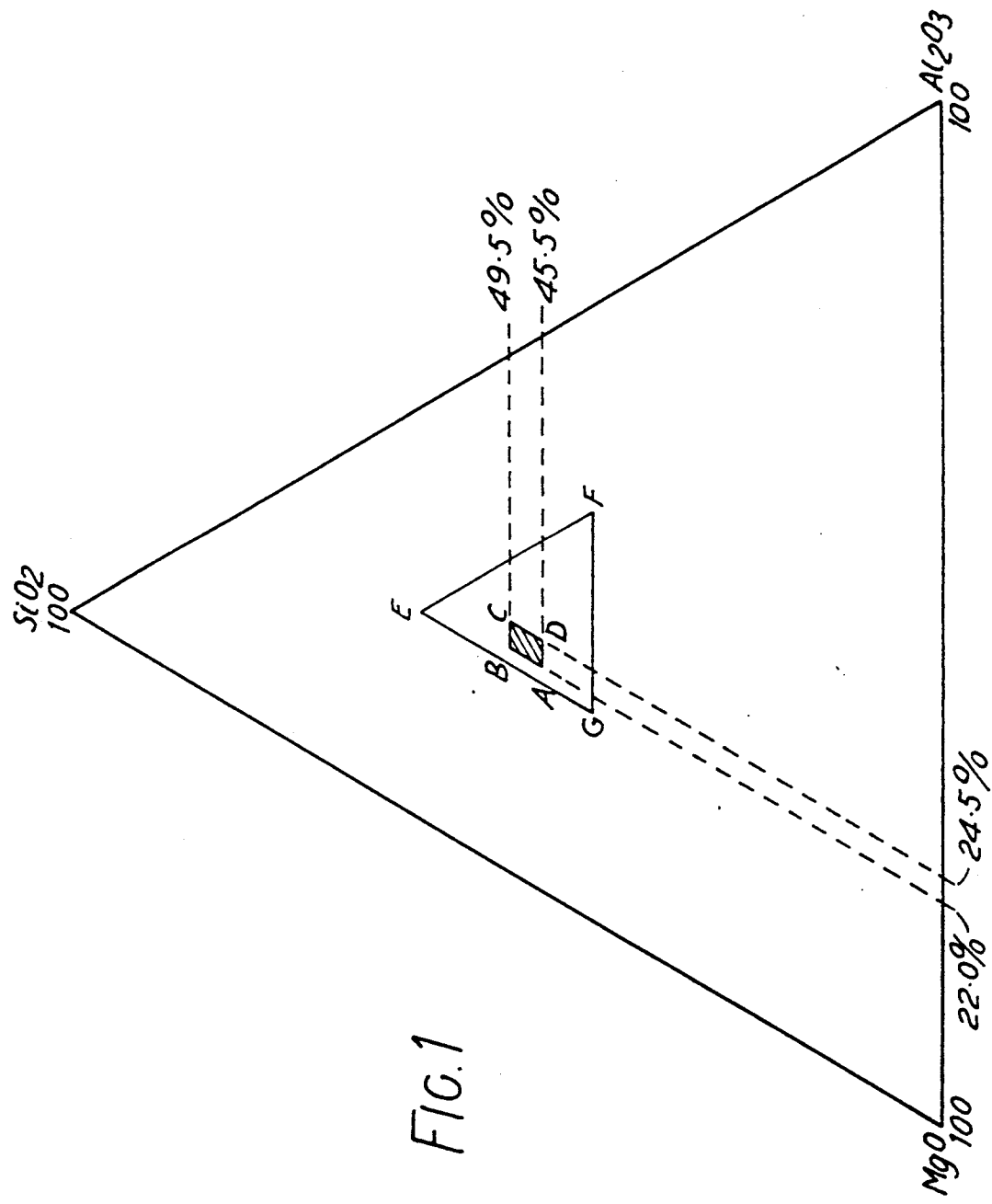
FIG. 1 is a ternary phase diagram showing an area representing the compositions of the invention in terms of percentage weight.

Referring first to FIG. 1, this shows an MgO-$SiO_2$-$Al_2O_3$ ternary phase diagram. The area ABCD contains compositions in accordance with the invention and is defined by the following ranges:

from 22.0% to 24.5% by weight of $Al_2O_3$,
from 45.5% to 49.5% by weight of $SiO_2$,
and the balance being MgO.

Figure 2:
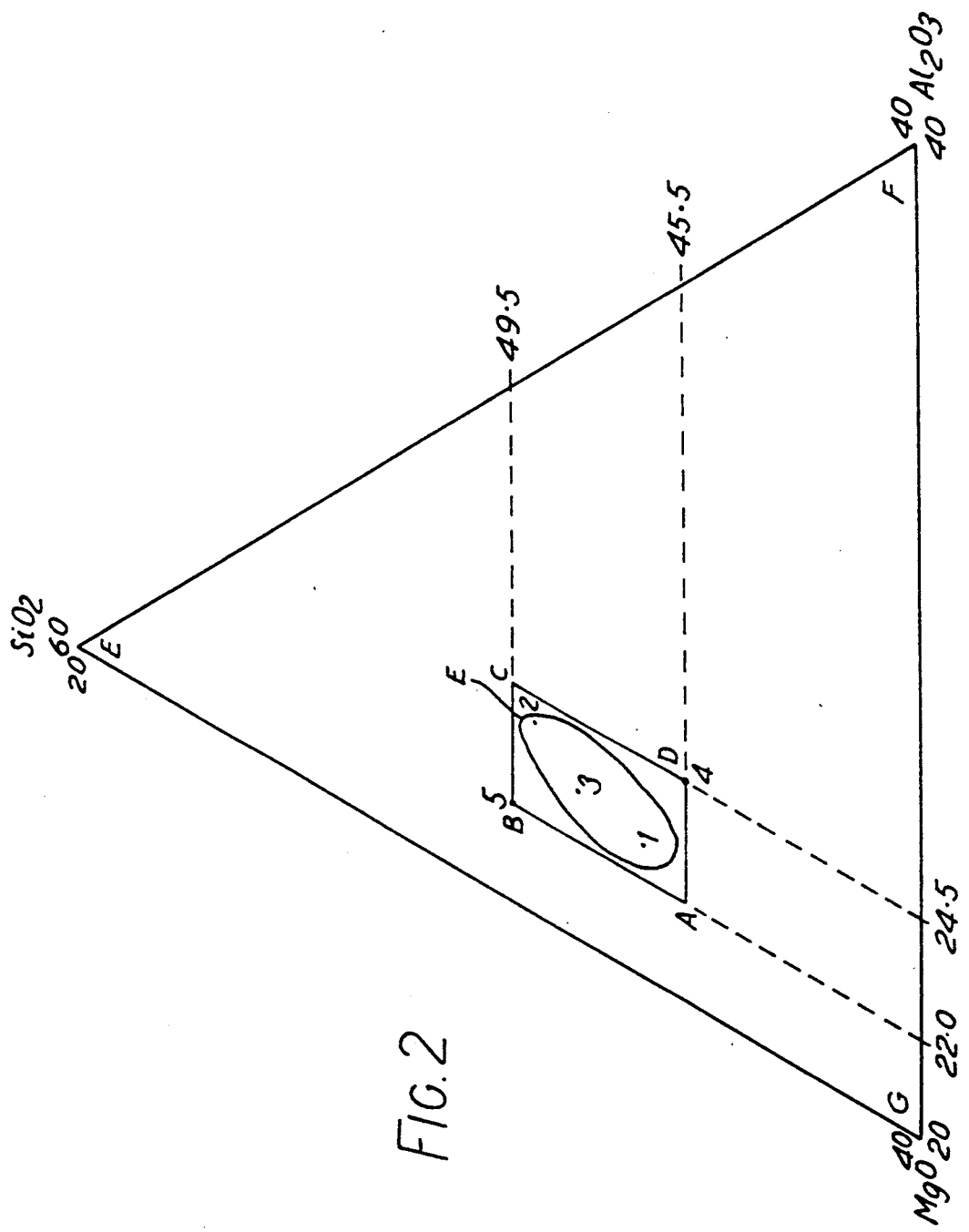
FIG. 2 is an enlargement of the area EPG indicated in FIG. 1.

FIG. 2 illustrates this area in greater detail and Table 1 below lists particular compositions which have been evaluated.

TABLE 1

| Example | $Al_2O_3$ % by weight | $SiO_2$ % by weight | MgO % by weight |
|---------|----------------------|---------------------|-----------------|
| 1 | 22.9 | 46.3 | 30.8 |
| 2 | 24 | 49 | 27 |
| 3 | 23 | 48 | 29 |
| 4 | 24.5 | 45.5 | 30 |
| 5 | 22 | 49.5 | 28.5 |

The examples of compositions in the above table were made by the following methods:

EXAMPLE 1

18.32 g of $Al_2O_3$, 37.04 g of $SiO_2$ and 24.64 g of MgO were provided as fine powders and subjected to the following process:

(a) the ingredients were mixed thoroughly by shaking in a plastic screwtopped jar for 10 minutes, (b) the resulting mixture was transferred to a cylindrical alumina crucible with an alumina lid and sintered at 1200° C. for 10 hours to produce a friable lump, (c) the lump was broken up and transferred to a platinum-10% rhodium crucible (Pt/10% Rh) (80 cm$^3$ capacity), (d) the Pt/10% Rh crucible was placed in a muffle furnace at 1550° C. and held at this temperature for two hours whilst the glass was molten, (e) the contents of the crucible were then poured into distilled water to form a brittle frit glass, (f) the glass was then dried at 160° C., (g) the glass was then ground in an Agate Cone Grinder such that all passed through a 180 micron steel sieve.

The steps indicated show the preparation of a sealing composition for use in an arc tube and also indicate the initial steps for a test procedure to determine the suitability of sealing compositions in accordance with the present invention.

Differential Thermal Analysis (using a heating rate of 7° C./minute) of a sample of this material showed crystallisation beginning at 957° C. and reaching a maximum rate of change at 997° C. as shown by the peak maximum at that temperature, produced on a chart recorder. Similarly melting begins at 1364° C. and reaches its maximum at 1387° C. Examination of the melting properties of a ground sample using an optical microscope fitted with a Hot Stage device showed melting at 1401° C. and crystal softening at 966° C.

EXAMPLE 2

19.2 g of $Al_2O_3$, 39.2 g of $SiO_2$ and 21.6 g of MgO were provided as fine powders and subjected to the process as for Example 1.

EXAMPLE 3

18.4 g of $Al_2O_3$, 38.4 g of $SiO_2$ and 23.2 g of MgO were provided as fine powders and subjected to the same process as for Example 1.

EXAMPLE 4

19.6 g of $Al_2O_3$, 36.4 g of $SiO_2$ and 24 g of MgO were provided as fine powders and subjected to the same process as for Example 1.

EXAMPLE 5

17.6 g of $Al_2O_3$, 39.6 g of $SiO_2$ and 22.8 g of MgO were provided as fine powders and subjected to the same process as for Example 1.

The amorphous glasses of Examples 2 to 5 soften in the range 950°–1000° C. and melt in the range 1400°–1420° C. as measured using the Hot Bench Microscope.

Examples 1 to 5 are represented by points 1 to 5 respectively on FIG. 2.

Samples of powdered glassy material corresponding to the above examples were mixed with a binder, pressed into 16 mm discs and sintered at 900° C. and at 1000° C. for 6 hours. Examination by X-Ray Diffractometry gave an analysis of the phases present in the crystalline form of the glass produced during sintering. The phases produced in the range of glasses were found to be:

α-Cordierite (TE $25 \times 10^{-7}/°C$.)
μ-Cordierite (TE $55 \times 10^{-7}/°C$.)
Enstatite (TE $78 \times 10^{-7}/°C$.)
Forsterite (TE $94 \times 10^{-7}/°C$. and
Spinel (TE $76 \times 10^{-7}/°C$.)

TABLE 2

| | XRD Analysis - Sintered Discs | |
|---|---|---|
| Composition | Percentage by weight of α-Cordierite (after 6 hours at 900° C.) | Percentage by weight of α-Cordierite (after 6 hours at 1000° C.) |
| Xo | 37 | 78 |
| 1 | 17 | 27 |
| 2 | Glass | 26 |
| 3 | 30 | 34 |
| 4 | Glass | 45 |
| 5 | 38 | 61 |

In the above Table, "Glass" means amorphous, i.e. having no crystalline component.

The percentage weights of phases present in the sintered samples were calculated from the intensities of the major line of the XRD spectrum of each phase compared with that of the same line measured in the XRD spectrum of a pure standard.

As indicated hereinbefore, the effect of α-Cordierite, with a relatively low Thermal Expansion (TE), is to reduce the overall TE of the crystalline mixture, thereby producing a difference in TE with the arc tube which could give rise to damaging stresses in that area.

The inventors have appreciated that the amount of α-Cordierite in the final seal can be controlled by the starting materials of the sealing composition and that it is possible to test the parameter of amount of α-Cordierite in a typical seal without making actual lamps.

The Examples referred as 1, 2 and 3 in Table 1 were found to contain relatively low proportions of α-Cordierite after sintering at 1000° C. and were deemed useful sealing compositions for sealing arc tubes intended for operation at seal temperatures of up to 1000° C., especially examples 1 and 2 which, after sintering for 6 hours at 1000° C., respectively contained only 27% and 26% by weight of the undesirable crystalline phase (as compared with 78% by weight in the known composition Xo). In contrast, examples 4 and 5, which lie at the boundary of area ABCD contained relatively large proportions of α-Cordierite after sintering at 1000° C. and were deemed unsuitable.

It is to be noted that the amount of α-Cordierite in a seal produced from a particular sealing composition and operated (i.e. sintered) at a given temperature cannot be predicted from the amount of α-Cordierite in a seal produced from that same particular sealing composition and sintered at a temperature lower than the given temperature. With reference to Table 2, all of examples 1 to 5 would be suitable for sealing arc tubes intended for operation at seal end temperatures of 900° C. but only examples 1 to 3 would be suitable for seal end temperatures of up to 1000° C.

Sealing compositions in accordance with this invention are all contained in the afore-mentioned area referenced ABCD and the inventors believe that the most useful compositions lie in the region enclosed by the broken line referenced E.

The inventors have tested compositions which fall outside area ABCD on the ternary phase diagrams and find that they have a softening temperature which is too low and/or a melting temperature which is too high and/or unsatisfactory coefficients of thermal expansion.

The sealing compositions of the present invention are advantageous in that they produce crystalline seals in contrast to the known Xo material which produces a predominantly glassy seal which requires conversion to a crystalline phase. The elimination of the conversion step improves the reproducibility of reliable seals.

Figure 3:
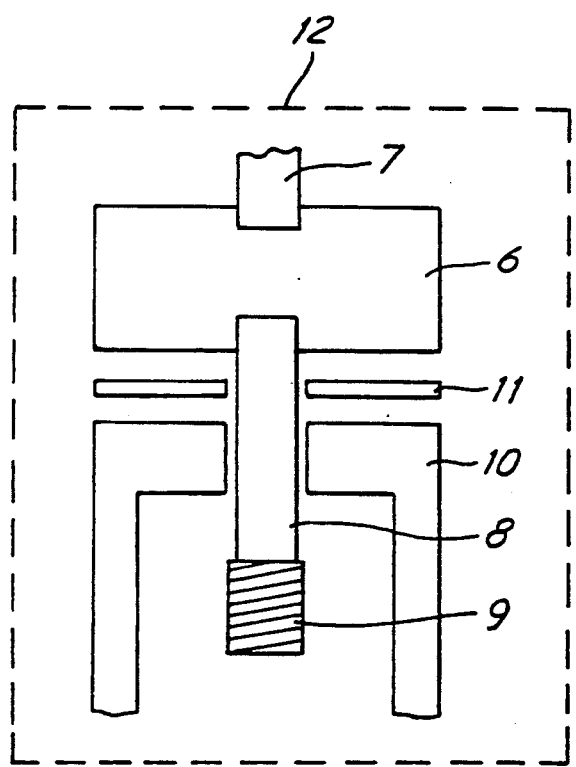
FIG. 3 represents the formation of an arc tube sealed with a composition of the invention.

An example of the use of a composition according to the present invention as used in the construction of a indium thallium sodium halide lamp is as follows:

FIG. 3 shows a cermet end closure member 6 carrying conducting members 7 and 8, member 8 supporting the lamp electrode 9 and one end of a polycrystalline alumina arc tube envelope 10. An annular disc 11 of a sealing composition according to the invention mixed with a binder such as a solution in toluene of methyl/butyl methacrylate is positioned around the member 8 and between the envelope and the end closure member 6.

The cermet cap 6 in the assembly is heated in an evacuable chamber, diagramatically indicated by 12, until the composition begins to melt and then pressure ranging from 0.05 to 1 MN per square meter is applied to make the joint between parts 6 and 10. The total time to make seals in lamps according to the above method is about 0.5 to 2 minutes. The short time required for making the seal reduces the risk of loss of fill from the arc tube due to volatisation of the fill when the second end is sealed in place. In a modification of this method, instead of using a preformed annular disc, a powder may be used.

The localised heating is achieved by virtue of the conducting property of the cermet which acts as a susceptor in an R.F. field. An R.F. power supply is used to seal the ceramic arc tube.

Lamps sealed with sealing compositions which are within area E in FIG. 2 have been found to run successfully for more than 3,000 hours at end operating temperatures between 850° C. and 1000° C.

The term 'crystalline ceramic' has been used in the present specification as a generic term for materials which in the U.K. would be termed 'ceramic'. Such materials are crystalline and able to withstand high temperatures. Examples of such materials include polycrystalline alumina, sapphire and spinel.

We claim:

1. A sealing composition for joining crystalline ceramic or cermet parts, the sealing composition comprising, as starting materials, a mixture of alumina ($Al_2O_3$), silica ($SiO_2$) and magnesia (MgO), the mixture comprising in the ranges of from 22% to 24.5% by weight of $Al_2O_3$, from 45.5% to 49.5% by weight of $SiO_2$, and from 26.0% to 32.5% by weight of MgO; the sealing composition containing less than 40% by weight, expressed as the percentage of the total weight of the mixture, of the crystalline phase α-Cordierite when subjected to a test procedure comprising the following steps:

(i) thoroughly mixing the constituents of the sealing composition and sintering the mixture at 1200° C. for 10 hours to produce a friable lump which is crushed, transferred to a platinum crucible with 10% Rhodium, and heated in a muffle furnace at 1550° C. for 2 hours while the glass is in a molten condition;

(ii) pouring the contents of the crucible into distilled water to form a brittle frit or cullet and, after drying at 160° C., grinding the glass in an Agate Cone Grinder to form a powder of particle size less than 180 μm;

(iii) mixing the powdered glass with 4% by weight of a binder comprising a solution in toluene of methyl/butyl methacrylate, and pressing the mixture in a 16 mm diameter die at 100 MPa to produce 1g samples;

(iv) sintering a sample continuously for 6 hours at a sintering tempterature equal to or greater than the temperature a seal made from the sealing composition is intended to withstand; and (v) evaluating, by X-ray Diffractometry, the proportion by weight, expressed as a percentage of the total weight of alumina, silica and magnesia, of the crystalline phase α-Cordierite in the sample sintered at the sintering temperature.

2. A sealing composition according to claim 1, the sealing composition consisting only of the mixture of $Al_2O_3$, $SiO_2$ and MgO.

3. A sealing composition according to claim 1 the sealing composition consisting of the mixture and up to 5% of additive.

4. A sealing composition according to claim 3 wherein the additive comprises titania ($TiO_2$).

5. A sealing composition according to claim 1 wherein the sintering temperature in the test procedure is 1000° C.

6. A sealing composition according to claim 5 wherein the mixture comprises silica, alumina and magnesia in proportions such that the mixture falls within the region enclosed by line E in the ternary phase diagram shown in FIG. 2 of the accompanying drawings.

7. A sealing composition according to claim 6 wherein the mixture consists of 22.9% by weight of $Al_2O_3$, 46.3% by weight of $SiO_2$ and 30.8% by weight of MgO.

8. A sealing composition according to claim 6 wherein the mixture consists of 24% by weight of $Al_2O_3$, 49.0% by weight of $SiO_2$ and 27.0% by weight of MgO.

9. A sealing composition according to claim 6 wherein the mixture consists of 23.0% by weight of $Al_2O_3$, 48.0% by weight of $SiO_2$ and 29.0% by weight of MgO.

10. An arc tube for a discharge lamp, the arc tube comprising an envelope of crystalline ceramic material and one or more end closures hermetically sealed to the envelope by a sealing composition according to any one of the preceding claims.

11. An arc tube according to claim 10 wherein the envelope is made of a material selected from the group consisting of polycrystalline alumina, sapphire and a spinel.

12. An arc tube for a discharge lamp, the arc tube comprising an envelope of crystalline ceramic material and one or more end closures hermetically sealed to the envelope by a seal formed from a sealing composition comprising, as starting materials, a mixture of $Al_2O_3$, $SiO_2$ and MgO, the seal containing less than 40% by weight of a crystalline phase α-Cordierite.

13. An arc tube according to claim 12 wherein the envelope is made of a material selected from the group consisting of polycrystalline alumina, sapphire and a spinel.

* * * * *